May 4, 1926.
C. A. RAQUÉ
1,583,177
VALVE STRUCTURE FOR EXPLOSIVE ENGINES
Filed Feb. 1, 1922
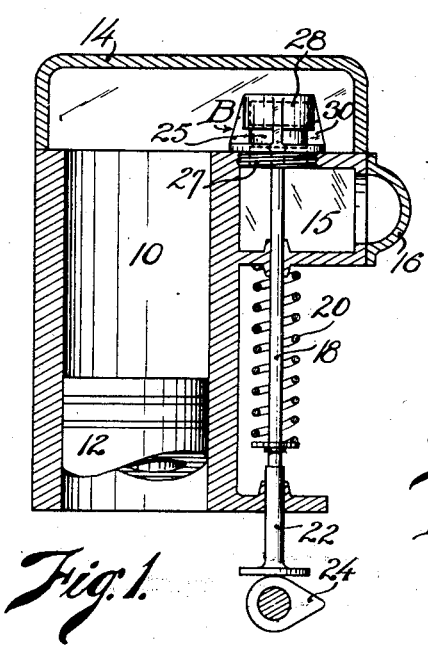
Fig. 1.
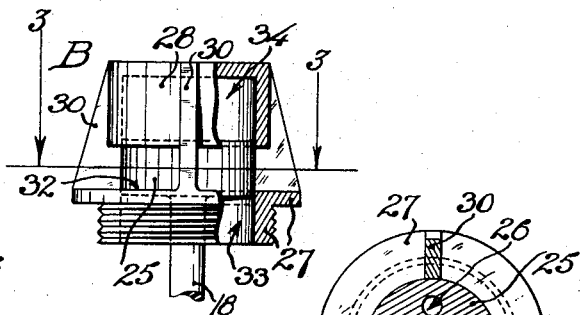
Fig. 2. Fig. 3.
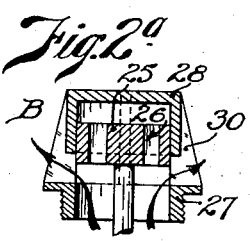
Fig. 2ª.
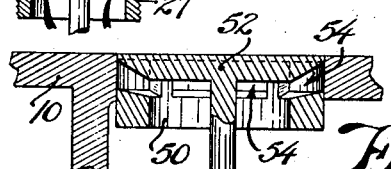
Fig. 6.
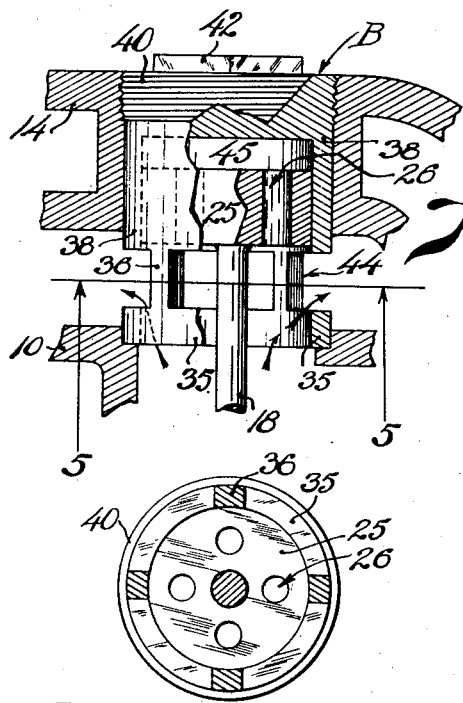
Fig. 4.
Fig. 5.
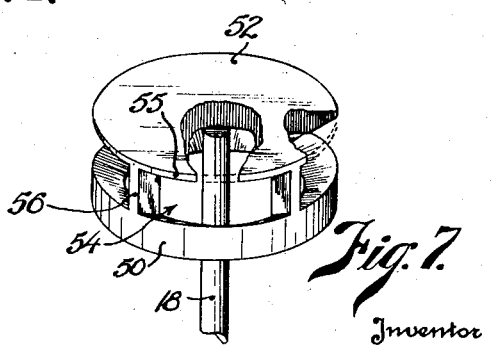
Fig. 7.
Inventor
Charles H. Raqué.
By Lynn L. Steele
Attorney.

Patented May 4, 1926.

1,583,177

UNITED STATES PATENT OFFICE.

CHARLES A. RAQUÉ, OF DENVER, COLORADO.

VALVE STRUCTURE FOR EXPLOSIVE ENGINES.

Application filed February 1, 1922. Serial No. 533,313.

*To all whom it may concern:*

Be it known that I, CHARLES A. RAQUÉ, a citizen of the United States, and resident of the city and county of Denver, State of Colorado, have invented certain new and useful Improvements in Valve Structures for Explosive Engines; and I do declare the following to be a full, clear, and exact description of the invention, such as will enable others skilled in the art to which it appertains to make and use the same, reference being had to the accompanying drawings, which form a part of this specification.

The object of this invention is to provide a valve structure for internal combustion engines which will eliminate the necessity for grinding valves from time to time as is required with the common so-called "mushroom" type of valve, and which will prevent the seating of particles of carbon and the like between the valve parts.

These objects are attained by means of a reciprocating valve member which is held to a fixed path by accurate guiding means. Preferably the guiding means is in the form of a valve housing through which gas may pass from under the valve and which will take up the force of the explosion from the head of the valve. In any event the fit of the valve with said guiding means is substantially gas tight so that a true valve function is performed by the valve.

In the drawings wherein certain embodiments of the invention are disclosed;

Fig. 1 is a vertical section through an engine showing one form of the invention in elevation in operative position;

Fig. 2 shows the same form partially in elevation and partially in section;

Fig. 2ª is a vertical section of the same form;

Fig. 3 is a cross section taken on line 3—3 of Fig. 2;

Fig. 4 is a view partially in vertical section and partially in elevation showing a modified form in operative position;

Fig. 5 is a cross section taken on line 5—5 of Fig. 4 and showing the valve structure;

Fig. 6 is a vertical section showing a further modification;

Fig. 7 is a perspective view of the valve of Fig. 6.

The drawings disclose in a general way a cylinder block 10 and a head 14 of an internal combustion engine, a piston 12 being shown and block 10 being provided with a gas-receiving chamber 15 fed from a manifold 16. A valve stem 18, controlled by a spring 20, is mounted in the cylinder block 10 and is operated through a push-rod 22 and a cam 24 in the usual manner.

The present invention resides in the valve member 25 carried by the stem 18, and in the casing B in which the valve operates and by which it is guided in all its movements and in which it is retained. The valve member or head 25 is provided with one or more apertures 26 extending from top to bottom therethrough. The casing B comprises a base 27 threaded for screwing into the block 10 and having a shoulder which engages the upper portion of block 10 when in operative position. A plurality of guiding and positioning fingers 30 extend from the base 27 and carry at their outer ends a hood or cap 28 spaced from the base 27 by openings 32 between fingers 30. The valve member 25 when in closed position, Fig. 2, has a gas-tight fit with the walls of the passage 33 within base 27, while its upper end has an equally tight fit with the inner walls of the cavity 34 within cap 28. When valve 25 is in elevated or open position, Fig. 2ª, it is positioned within said cap 28, said valve when entirely open being disposed entirely within the cap or substantially so. The incoming explosive gas may then pass outward between base 27 and the valve and between the fingers 30 into the explosion chamber of the engine. The apertures 26 in the valve insure equalizing of the pressure on both sides of the valve member 25 at all times. When the valve is in the closed position of Fig. 2, the force of the explosion is taken by the sides of the valve only, since the head or top of the valve is covered and protected by the cap 28 and no force is transmitted to the push-rod 22 and the cam 24 or its shaft.

In Figs. 4 and 5, a modified form is disclosed wherein the casing B is more in the from of a plug having a base 35 snugly seated in the cylinder block 10, fingers 36, and a cap connected with base 35 by said fingers 36, said cap being indicated at 38 and threaded into the cylinder head 14 as indicated at 40, a square boss 42 being provided to facilitate the threading operation so that the base 35 may be tightly seated on the cylinder block. The same type of valve 25 is used as in the form of Figs. 1 and 2, and the operation is the same, fuel gas traveling through the passages 44 in casing B.

In the form of Figs. 5 and 6, the cylinder block 10 performs the functions of a casing for the valve. The valve comprises an annular guide ring 50 which works in a cylindrical bore in the block 10 and a valve top or head 52 also adapted to work in said bore and close the same against the passage of gas. The top 52 is spaced from the ring 50 by means of gas passages or openings 54 disposed between connecting fingers as shown at 56. The edge of top 52 is comparatively thin as shown at 55 but is at the same time thick enough to insure a good sealing joint and prevent burning out. The thin edge permits quick passage of gas inasmuch as the passage is thereby quickly opened once movement of the valve has started. The ring 50 and the fingers 56 guide the valve top 52 during all movements. In this form however the cam shaft takes the force of the explosion transmitted to the top of the valve.

It will be noticed that in all forms, the valve moves with a sort of shearing operation into closing position so that particles of carbon and the like are prevented from being positioned between the sealing faces. It will also be noted that the valve is sealed by engagement of relatively sliding faces, and that the common nuisance of frequent valve grinding is eliminated. All movements of the valve are definitely and accurately guided so that proper fitting and seating is assured.

In the form of Figs. 1 and 2, the casing B is positioned before cylinder head 14 is mounted, whereas in the form of Fig. 4 the casing is applied after mounting the head 14.

I claim:

1. In combination, an engine block, a valve casing thereon, said casing having a bore open at one end and gas passages leading laterally from said bore, said engine having a chamber for communication through the open end of said bore, and a valve reciprocable in said casing bore to open and close said passages.

2. In combination a valve casing having a bore therein, open at its inner end and closed at its outer end, and having gas passages leading laterally from said bore, a cavity being provided adjacent said closed end, and a valve member reciprocable in said bore and into said cavity to open and close said passages.

3. In combination, a valve casing having a bore therein, open at its inner end and closed at its outer end, and having fingers forming gas passages leading laterally therethrough from said bore, a cavity being provided adjacent said closed end, and a valve member reciprocable in said bore and movable into said cavity, said valve member having an aperture therein from its inner face to its outer face to communicate with said cavity.

4. In combination, an engine having an explosion chamber and a gas-receiving chamber, a valve casing mounted on the engine within said explosion chamber and having a gas passage therethrough communicating with said explosion chamber, said casing also having a bore communicating at one end with said gas-receiving chamber and from which said passage leads, and a valve member movable in said bore to open and close said passage.

5. In combination, an engine having an explosion chamber and a gas-receiving chamber, a valve casing mounted on the engine within said explosion chamber and having a gas passage therethrough communicating with said explosion chamber, said casing having a bore communicating with said gas-receiving chamber at one end and from which said passage leads, said casing being closed at the opposite end of said bore and providing a cavity, and a valve member movable in said bore and into said cavity whereby said passage is opened and closed.

In testimony whereof I affix my signature.

CHARLES A. RAQUÉ.